Figure 1:
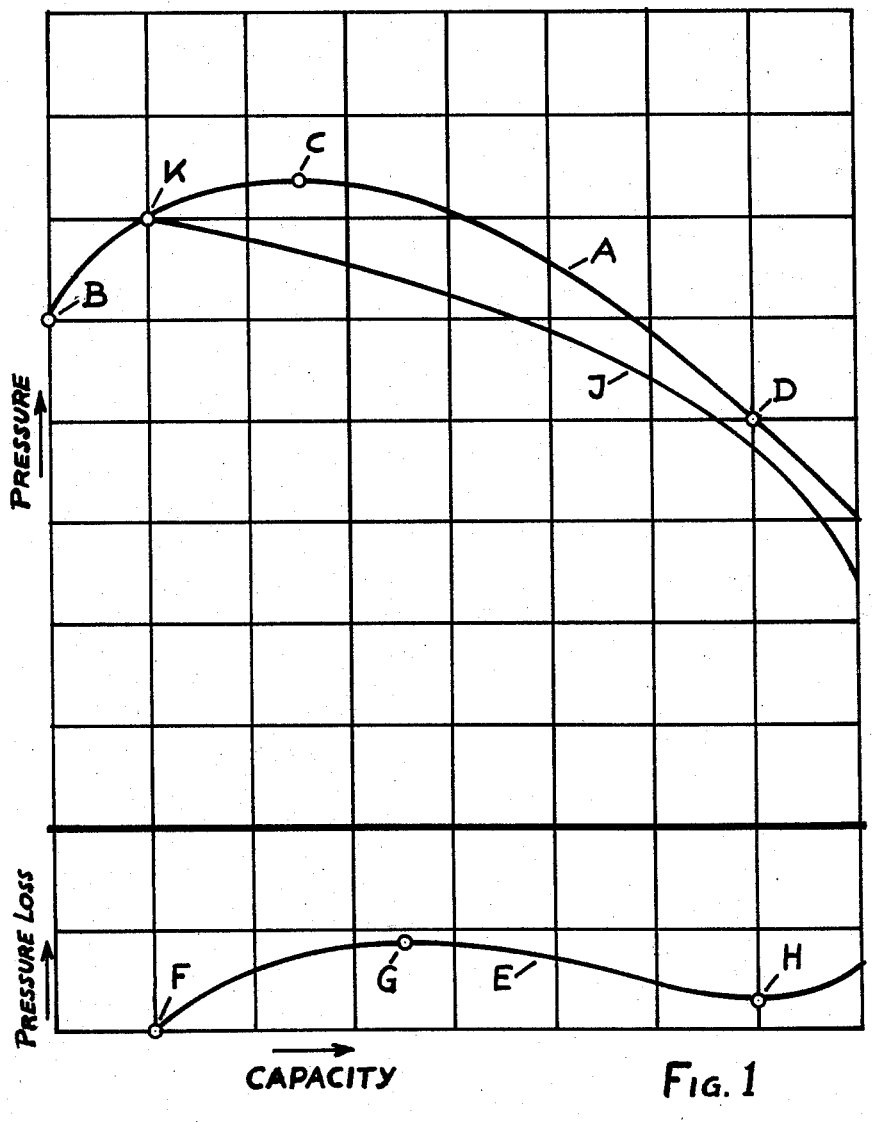

Dec. 18, 1962 W. ODENDAHL 3,068,882
VALVE CONSTRUCTION
Filed July 2, 1959 2 Sheets-Sheet 1

WITNESSES:

INVENTOR:
Wilhelm Odendahl

Dec. 18, 1962 W. ODENDAHL 3,068,882
VALVE CONSTRUCTION
Filed July 2, 1959 2 Sheets-Sheet 2

WITNESSES:
INVENTOR:
Wilhelm Odendahl

United States Patent Office 3,068,882
Patented Dec. 18, 1962

3,068,882
VALVE CONSTRUCTION
Wilhelm Odendahl, Gummersbach, Germany (% Edgar Lorenzsonn, 1921 Browning Road, Madison, Wis.)
Filed July 2, 1959, Ser. No. 824,533
Claims priority, application Germany July 5, 1958
5 Claims. (Cl. 137—116)

This invention relates generally to valve constructions, and as specifically illustrated and disclosed in this specification concerns improvements in construction of non-return discharge valves for use with centrifugal pumps and particularly with centrifugal boiler feed pumps handling hot water.

More specifically, the present invention concerns an improved valve construction which provides a plurality of means automatically throttling the flowing through in such a manner that the pressure of the flowing out water decreases when flow increases although the pressure of the entering water increases within a part of the capacity range.

It is a further object of this invention to combine the new non-return valve constructions with well-known by-pass devices affording automatic protection to centrifugal pumps against any possible light load.

The pressure of a centrifugal pump driven by constant speed of revolution varies with the capacity. The pressure curve of a centrifugal pump is the line of the measured pressures at all possible pump capacities. This pressure curve can have an apex which divides the curve in a branch with positive differential quotients between the shut-off pressure point and the apex and in a branch with negative differential quotients between the apex and the maximal capacity of the pump.

In accordance with observavtions and researches, operation within the capacity range of the branch with positive differential quotients causes pulsating streaming in the pressure piping. This pulsation can damage or destroy pumps and pipes and has to be avoided.

Especially high-pressure boiler feed centrifugal pumps have very flat pressure curves which should have only negative differential quotients in the whole capacity range. But due to casting and machining tolerances the real pressure curves are very often deformed and have apexes and branches with positive differential quotients causing pulsations.

Also high-pressure boiler feed pumps handling hot water increase the temperature of the flowing through water by intensively churning within the pumps. In the light load range the temperature increase is very high and decreases specific water weight and consequently pressure. At shut-off operation all power changes in heat which cannot be removed because no water flows. At light load an enormous part of power goes as heat in the water which becomes the hotter the less water flows. When the water entering into the pump is very hot the temperature increase caused by the churning effect brings about a noticeable decrease of the specific weight of the water and a corresponding pressure reduction. Because the temperature increase is variable with the water flow a cold water pressure curve of a centrifugal pump cannot be converted by a constant factor to a hot water pressure curve but by a variable weight factor corresponding to the weight reduction by the churning effect. Such a converted real hot water pressure curve has at all times an apex and a branch with positive differential quotients causing pulsations in the pressure p'pes.

In accordance with research, pulsating streaming caused by positive differential quotients of a centrifugal pump pressure curve becomes stationary by throttling the flow at the discharge of the pump in such a manner that the pressure curve measured behind the throttle has only negative differential quotients.

The pressure loss of a usual invariable throttle increases by the squared value of the flowing through and is therefore at the nominal capacity of a centrifugal pump too high.

It is the main object of the present invention to provide a non-return discharge valve which throttles the flowing through in such a manner that the pressure curve measured behind the non-return valve has only negative differential quotients although the pressure curve of the preceding centrifugal pump may have an apex and that the pressure loss of said non-return valve is acceptable at the nominal capacity of the pump. Such a non-return valve has to have a pressure loss curve which ascends to an apex and falls with further increase of fluid flowing therethrough.

The FIGURE 1 is a diagram of a pressure curve of a centrifugal pump with the pressure loss curve of a new non-return discharge valve and the pressure curve measured behind said valve fed by said pump.

Figure 2:
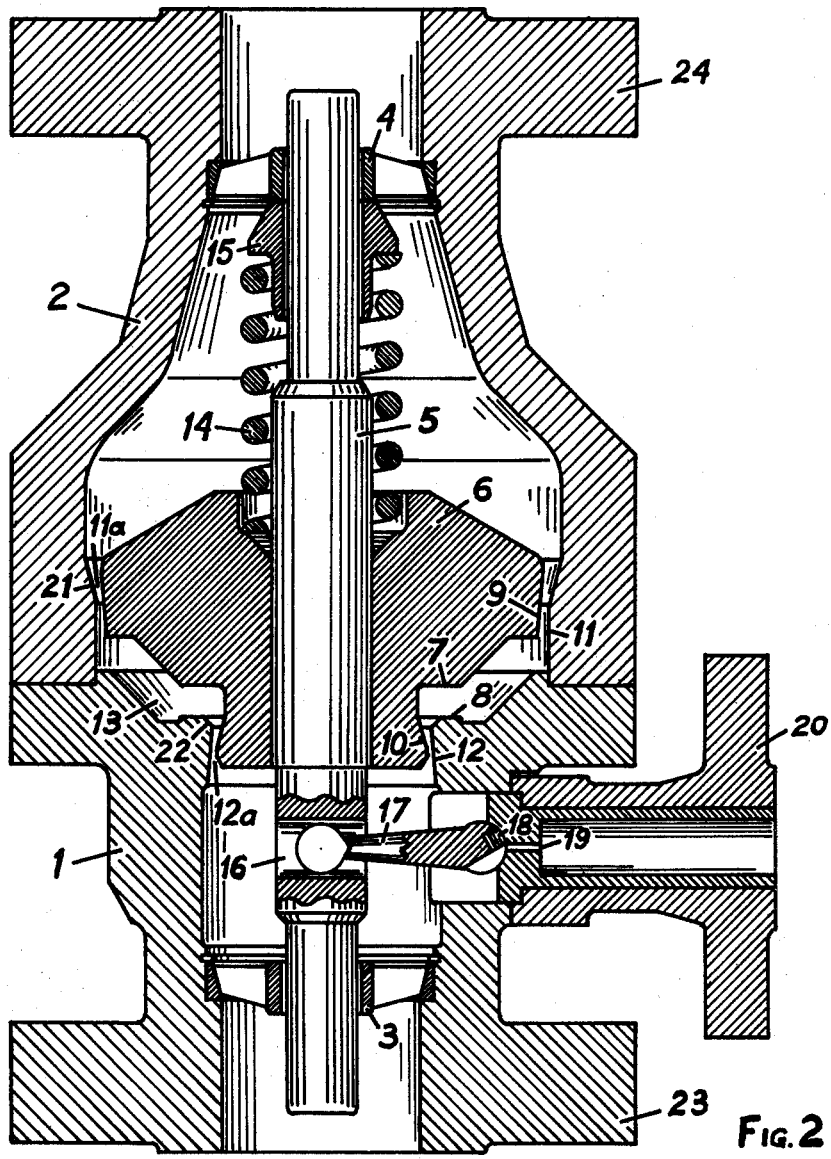

The FIGURE 2 is a side elevation in section of the new non-return discharge valve combined with an automatic by-pass device.

Referring to FIG. 1, the pressure curve A of the centrifugal pump begins with the shut-off pressure point B and has an apex C. The differential quotients of the branch B—C are positive and cause pulsating flow which has to be avoided. The pressure at nominal capacity of pump is marked by point D. The differential quotients of the branch C—D are negative and afford stationary streaming.

The pressure loss curve E of the non-return discharge valve with automatic by-pass device commences at the lowest pump capacity avoiding evaporation within the pump designated by point F. The curve E has an apex G and falls to point H.

The pressure curve J measured behind the non-return discharge valve with automatic by-pass device begins in point K of the curve A and has only negative differential quotients. It is the difference of the curve A and the pressure losses of the non-return discharge valve according to curve E.

To correct a pressure curve A of a centrifugal pump by a new non-return discharge valve it is only to draw from point K which is determined by the by-pass capacity the curve J having only negative differential quotients and a minimal distance from the curve A.

FIG. 2 shows a non-return discharge valve with automatic by-pass device in section. Said valve is able to produce the needed pressure loss curve E correcting the pump pressure curve A.

Guide members 3 and 4 are respectively secured in inlet casing 1 and outlet casing 2 which guide members receive shaft 5 capable of axial movement within the lifting range of the valve member 6. The valve member 6 is secured to shaft 5 and has a valve seat 7 which engages the casing seat 8 when no water flows through the outlet casing 2.

Valve member 6 is provided with a large skirt 9 defining a gap 11a with wall portion 11. Wall portion 11 is slightly outwardly tapered. Thus, upon lifting of valve member 6, the width of gap 11a increases slightly.

Valve member 6 is further provided with a small skirt 10 defining a gap 12a with inwardly tapered wall portion 12. Thus, upon lifting of valve member 6, the width of gap 12a decreases until skirt 10 is lifted out of the bore defined by wall portion 12.

Between the skirts 9 and 10 is defined a shock absorbing chamber 13. A spring 14 is disposed between valve member 6 and a sliding socket 15, the upper end of which engages the upper guide member 4 receiving the upper end of the shaft 5. Spring 14 is so proportioned that the force obtained by its resilient action is ample to ensure the needed throttling of the fluid flowing therethrough, and spring 14 also ensures that a by-pass is properly open when the valve closes. The by-pass includes a lever 17 loosely received in a coupling hole 16 of shaft 5, a slider 18 and a by-pass nozzle or port 19. A by-pass flange 20 is provided for connecting a water pipe outlet thereto.

On their upper ends the walls 11 and 12 are provided with tapered enlargements 21 and 22, respectively. An inlet flange 23 is provided at casing 1 to couple the valve casing to the discharge flange of a centrifugal pump (not shown) and an outlet flange 24 is provided at casing 2 to couple a feed pipe (not shown) to the valve casing, are provided.

If the coupled centrifugal pump is running but the feed pipe is closed, no water flows through outlet flange 24, and valve member 6 is kept by the force of the spring 14 in closed position, whereby valve seat 7 engages casing seat 8. By means of its hole 16 shaft 5 keeps lever 17, slider 18 in the upper position and therefore the by-pass nozzle 19 remains fully open and the determined quantity of water can be discharged therethrough.

Valve member 6 is lifted upon any water flowing out through the flange 24 whenever more feed water is used than can be discharged through nozzle or port 19. This flow of feed water is throttled by the gaps 11a and 12a. The throttling produces forces at skirts 9 and 10 to act against the force exerted by spring 14 upon valve member 6. Accordingly, upon lifting of valve member 6, slider 18 is shifted more and more into a closed position and nozzle 19 is fully closed when the skirt 10 is leaving the wall portion 12.

As was said above, the curve E in FIG. 1 represents the pressure loss characteristics to be produced. Two features are apparent. With increasing upward lifting of valve member 6 from valve seat 8, the quantity flowing through to be discharged through flange 24 increases. But also, upon an increasing lift of valve member 6 the force exerted thereupon by spring 14 and to be balanced by the dynamic pressure loss, increases in accordance with the spring characteristics. This follows from the fact that spring 14 normally keeps the valve closed.

Relatively speaking, when valve member 6 is first lifted from the closed position, gap 11a is small and gap 12a is large. The spring force of course is still relatively low so that the balancing force set up by the overall dynamic pressure loss is quite low.

Upon further lifting, gap 11a increases but gap 12a decreases. Thus, the ratio: width of gap 11a/width of gap 12a increases because of the tapering of wall portions 11 and 12. The force acting upon valve member 6 due to the pressure loss still has to be balanced by the increasing spring force and therefore the pressure loss of both gaps increases.

The pressure loss would increase even if both gaps 11a and 12a would increase slightly i.e. if the quotient or ratio of the width of gaps 11a and 12a were to remain constant.

However, it has been found that the pressure loss can be made decreasing again with still further increasing lifting stroke of valve member 6, when the said quotient or ratio is made to decrease. This is carried out in rapidly increasing the width of gap 12a while increasing the width of gap 11a only slightly. Looking at FIG. 3, it will be observed, that effective gap 12a increases its width rapidly when and after skirt 10 has been lifted out of the bore defined by wall portion 12, while gap 11a is still relatively narrow at wall portion 21.

Accordingly, there is first an increase of pressure loss until a maximum has been reached (point G in curve E of FIG. 1), and thereafter the pressure loss decreases again to a minimum due to the rapid increase of the width of gap 12a, with gap 11a remaining relatively narrow.

The maximum pressure loss is produced primarily by skirt 10 at gap 12a. Prior to this value, i.e. when the valve member 6 started to lift from seat 8, the pressure loss was produced primarily of large skirt 9 and gap 11a. After the maximum pressure loss has been surpassed, i.e. with still increasing valve lift, skirt 10 has been lifted out of wall 12 and the pressure loss again primarily occurs at gap 11a of skirt 9.

The sizes of slits 11a and 12a are variable with the lifting height of the valve 6 as stated, this can be obtained by accordingly shaping the skirts 9 and 10 and/or the walls 11 and 12.

The sizes of the slits 11a and 12a can be easily determined in the well-known calculation manner for throttles in series. A useful simplification is the fact that the produced force of a skirt arrangement is independent from the skirt diameter and determined only by the slit width because cross section of skirt grows but throttling effect of skirt gap falls with the squared skirt diameter value and therefore compensate each other. Therefore the flowing through can be calculated leaving the skirt diameters out of consideration.

The force of the spring 14 is determined for each valve lifting height by the spring force curve. The force caused by the flow throttled in gaps 11a and 12a has to compensate the spring force. This compensation is in a large range to realize by various sizes of gaps 11a and 12a as skil'ed in the art making calculations of throttles in series. The whole throttling effect of the gaps 11a and 12a can be varied within the said range at each valve lifting height by variation of the quotient of the local sizes of gaps 11a and 12a. The determination of the shapes of throttling means is also possible by application of the well-known knowledge.

I claim as my invention:

1. A valve assembly including a casing with a flow passage therethrough, a valve seat, a pressure difference responsive valve in said passage and capable of closing said passage when engaging said valve seat, means for urging said valve against the flow direction toward said valve-closing position, two skirts of different diameters being in series arrangement in said passage and being parts of said valve, said casing having wall portions respectively surrounding said skirts and arranging therewith throttling gaps, said skirts and wall portions being shaped so that the local widths of said throttling gaps vary within the valve lifting range, the width of the throttling gap around a larger skirt divided by the width of the throttling gap around the smaller skirt being a quotient the value of which increases within the first part of valve lifting range and decreases within a following part of said range of increasing valve lift.

2. A valve assembly including a casing with a flow passage therethrough, a pressure difference responsive valve in said passage, two skirts of different diameters on said valve, wall portions of said casing disposed around said skirts and arranging therewith throttling gaps being in series arrangement in said passage, a shock absorber chamber between said skirts and the wall of said casing, a spring acting on said valve to close it against the flow direction, said skirts and wall portions being shaped so that the local widths of said throttling gaps vary within the valve lifting range, the quotient of the width of the throttling gap around the larger skirt divided by the width of the throttling gap around the smaller skirt having a value which increases within the first part of the valve lifting range and decreases with still further increasing valve lift of said range, a by-pass valve assembly including a by-pass port in said casing, a by-pass valve element movable to control the flow of fluid through said port, and a mechanical linkage interconnecting the pressure difference responsive valve and the by-pass valve element so that as the main valve opens, the by-pass valve closes within said first part of the main valve lifting range and remains closed with increasing valve lift.

3. In combination, a main valve assembly including a casing with a flow passage therethrough, a spring operated non-return valve with two skirts of different diameters disposed in said passage for controlling the flow of fluid therein and the pressure loss thereof by means of two throttling gaps respectively defined by said two skirts and adjoining wall portions of said casing, said gaps being in series arrangement and having different and variable local widths, a shock absorber chamber between said casing and said skirts, said skirts and wall portions being shaped in such a manner that a flow increase in said passage and in said throttling gaps causes a pressure loss of the said flow through said passage having a maximum in the lower part of the flow range and a minimum in the further part of the flow range, said main valve assembly further including a by-pass valve assembly including a by-pass port in said casing, a by-pass valve element movable to control the flow of fluid therethrough and a mechanical linkage interconnecting the non-return valve and the by-pass valve element so that as the non-return valve opens, the by-pass valve closes within the part before said maximum pressure loss and the by-pass valve remains closed within the further part of said pressure loss curve and the flow closing the by-pass valve has a value larger than the flow through the full open by-pass valve.

4. In a valve structure, a casing including a valve seat and a flow passage, a non-return pressure difference responsive valve member capable of engaging said seat for closing the flow passage, said valve member and said casing defining two annular throttling gaps of variable widths and different diameter, there being a range of lifting of said valve member in which the ratio, width of gap having the larger diameter to the width of the other gap decreases.

5. In a valve structure as set forth in claim 4 there being another range of valve lift preceding said first mentioned range, in which said ratio increases.

References Cited in the file of this patent

UNITED STATES PATENTS

| | | |
|---|---|---|
| 1,539,617 | Williston | May 26, 1925 |
| 1,729,469 | Anderson | Sept. 24, 1929 |
| 2,687,276 | Hornsby | Aug. 24, 1954 |

FOREIGN PATENTS

| | | |
|---|---|---|
| 192,663 | Sweden | of 1937 |
| 948,104 | Germany | of 1956 |

OTHER REFERENCES

Odendahl: German application Serial No. Sch. 16537, printed July 12, 1956 (x11/47g.).